Patented Oct. 24, 1950

2,527,223

UNITED STATES PATENT OFFICE 2,527,223

COPOLYMERS OF 2-VINYLDIBENZOFURAN AND THEIR PREPARATION

Edward A. Kern, Pittsfield, Mass., assignor to General Electric Company, a corporation of New York No Drawing. Application December 11, 1944, Serial No. 567,787

7 Claims. (Cl. 260—80.3)

The present invention relates broadly to copolymers of vinyl compounds and their preparation. More specifically, the invention is directed to the preparation of copolymers of 2-vinyldibenzofuran and a different organic compound containing at least one polymerizable $CH_2=C<$ grouping.

Vinyl-substituted dibenzofurans, such as 2-vinyldibenzofuran, and the preparation of such compounds are described and claimed in the copending application of Abbott, Serial No. 567,784, filed concurrently herewith, now Patent Number 2,498,473, and assigned to the assignee of the present invention. This invention is directed to the production of copolymers of 2-vinyldibenzofuran by the simultaneous polymerization of this compound and other organic polymerizable compounds containing at least one polymerizable $CH_2=C<$ grouping, examples of which are vinyl compounds; acrylic acid; acrylic acid esters; acrylic acid nitrile; dienes, such as isoprene, butadiene, etc.; divinyl compounds such as divinyl benzene, divinyl dibenzofuran, etc.; diallyl compounds; etc. Illustrative examples of other polymerizable organic compounds with which 2-vinyldibenzofuran may be copolymerized are unsaturated hydrocarbons, such as indene, acenaphthylene, etc.; polymerizable oils; cyclopentadiene; and unsaturated alkyd resins, such as diethylene glycol maleate, etc. Such copolymers yield compositions suitable for a large variety of applications.

In carrying out these simultaneous polymerizations, 2-vinyldibenzofuran and compounds copolymerizable therewith may be employed as such, in the presence of a diluent or solvent or in suspension or emulsion form. The polymerization may be carried out in the presence or absence of a catalyst. The nature of the products produced depends upon the conditions of polymerization and the purity of the monomers employed. In general, the purer the monomers the more readily and completely the polymerization occurs. In some cases where 2-vinyldibenzofuran copolymerizes with difficulty and to a small degree, it will in the presence of a third monomer readily form a copolymer or a mixed polymer of the three monomers.

The polymerization may be accelerated or retarded so that products having vastly different physical properties are formed. In general, it is desirable to choose conditions of polymerization such that the monomers polymerize at about the same rate. If the rate of polymerization of one monomer is considerably greater than that of the other monomer or monomers employed, it will go practically to completion before the other monomer or monomers have polymerized or copolymerized. This may lead to the formation of mixed polymerization masses instead of copolymers.

The copolymerization may be accelerated by the use of small amounts of such compounds as the organic or inorganic oxides, oxygen-producing compounds, air, oxygen, ozone, boron trifluoride, tin tetrachloride, antimony pentachloride, acids such as hydrochloric and acid-acting compounds, halogens, hydrohalogens, substances having a large surface area such as carbon black, finely divided earths, metallic powders, silex, etc., which act as rate accelerators.

Various proportions of 2-vinyldibenzofuran and the compounds copolymerizable therewith may be used, a variation in proportions producing a variation in the properties of the final copolymer and the proportions employed being suited to the nature of the final product desired. For example, 2-vinyldibenzofuran polymerizes in all proportions with styrene to produce copolymers that have in general physical properties superior to those obtained from a simple mixture of the polymers. Thus, the copolymers of 2-vinyldibenzofuran and styrene are useful in many instances where styrene would be unsuitable due to its low softening point, but at the same time, the copolymers still possess electrical characteristics of the same order as polystyrene.

The copolymerization products of the present invention may vary in accordance with the nature and proportions of the copolymerizable compound which is copolymerized with the 2-vinyldibenzofuran. For example, 2-vinyldibenzofuran copolymerizes with butadiene to produce copolymers which vary from an elastic, flexible material when the proportion of 2-vinyldibenzofuran is high in the monomeric mixture to rubber-like masses when the butadiene component is in high proportion in the monomeric mixture.

2-vinyldibenzofuran can be cross-linked by compounds such as divinyl, diallyl and diethylene glycol ester compounds to form products that have increased heat resistance and can be readily machined and worked. Such products tend toward insolubility and infusibility as the percent of divinyl compound increases. The copolymers of 2-vinyldibenzofuran with other vinyl compounds, with acrylic acid, acrylic acid esters, and unsaturated compounds are thermoplastic and can be treated in general as any thermoplastic material. For example, they can be injection or compression molded, cast into films, oriented and fused.

The following examples will further illustrate how the invention may be carried out in practice, but the invention is not restricted by these examples. All parts are by weight.

Example 1

10.4 parts of styrene and 19.4 parts of 2-vinyldibenzofuran are heated for 24 hours at 80° C. in a closed vessel, then heated for 12 hours at 100° C. and for 12 hours at 125° C. A solid clear glassy polymeric mass is obtained which can be ground up and mixed with a suitable filler, such as mica dust, silex, talc, α-cellulose, ground paper, asbestos, the metallic oxides, linen rags, etc., to produce an excellent molding compound. If this solid mass is dissolved in benzene and precipitated with methyl alcohol so that any traces of monomeric material and the short chain length copolymer are removed, the resulting material will have a heat-distortion point in the neighborhood of 100° C. and produces clear pieces when injection or compression molded. It has a power factor of .04% in the range of 60 cycles to 1 megacycle and has a dielectric constant of 2.6.

Example 2

10.4 parts of styrene and 38.8 parts of 2-vinyldibenzofuran are heated in a closed vessel at 125° C. for 24 hours. A hard, clear glassy mass is obtained of lower average molecular weight than produced in the preceding example. The above copolymer can be ground and mixed with a plasticizer such as tricresylphosphate, a eutectic mixture of diphenyl and diphenyl oxide, 2-ethyldibenzofuran, dibutylphthalate, etc., to yield soft flexible masses which may be used as artificial leathers or water repellent compounds. For example, 100 parts of the above copolymer and 50 parts of 2-ethyldibenzofuran produce a mass which may be worked on rolls to form plastic sheets. The amount of plasticizer added may be varied within wide limits to produce compositions ranging from soft sticky masses to hard, tough resins.

Example 3

10.4 parts styrene and 77.6 parts of 2-vinyldibenzofuran are heated in a closed vessel at 65° C. for 96 hours. A hard, glassy polymeric mass is obtained which contains a copolymer of higher average molecular weight than that produced in Example 1. The heat-distortion point is higher than that of Example 1. This material when purified and plasticized with 25% of 2-ethyldibenzofuran produces films which possess excellent electrical characteristics.

Example 4

20.8 parts of styrene and 19.4 parts of 2-vinyldibenzofuran are heated in a closed vessel at 65° C. for 24 hours, then at 125° C. for 12 hours. A water-clear product is obtained.

Example 5

104 parts of styrene and 194 parts of 2-vinyldibenzofuran are heated with 600 parts of water, 3 parts of sodium peroxide and 5 parts of potassium hydroxide at 130° C. for 24 hours in a pressure-tight vessel. The resulting polymerization mass is ground, washed with water, extracted with methyl alcohol and then dried. The amount of water, amount and nature of the alkali may be varied within wide limits.

Instead of sodium peroxide, any inorganic or organic peroxide, the persulfates, the perborates, oxygen-supplying compounds, oxygen, air or ozone may be used.

Example 6

104 parts of styrene, 194 parts of 2-vinyldibenzofuran, 300 parts of benzene are refluxed for 48 hours. The resulting viscous mixture is cooled, diluted with benzene and precipitated with methyl alcohol, yielding a whitish precipitate. The ratio of styrene to 2-vinyldibenzofuran may be varied at will, as may the nature and to a more limited extent, the amount of the solvent or solvents.

Example 7

104 parts of styrene and 194 parts of 2-vinyldibenzofuran are dissolved in 300 parts of trichlorethylene. The solution is cooled to 20° C. and the polymerization is started by the addition of some drops of the addition compound of $BF_3$ and diethylether. The reaction mass is constantly stirred and kept as near 20° C. as possible by cooling. After several hours, the polymerization is essentially completed and a white polymerized mass is precipitated with methyl alcohol. The proportions of styrene to 2-vinyldibenzofuran may be varied at will.

The reaction may be carried out at higher temperatures but a copolymer of lower average molecular weight is obtained. At lower temperatures a product of much higher average molecular weight is obtained.

Instead of the addition compound of $BF_3$ and diethylether, $SnCl_4$, $SbCl_5$, HCl, or $AlCl_3$ may be used.

Example 8

To 194 parts of 2-vinyldibenzofuran and 104 parts of styrene is added 4.7 parts of stearic acid. This mixture is stirred into 600 parts of distilled water containing 1.9 parts KOH, 0.9 part $Na_2CO_3$, 0.9 part potassium persulfate, 0.9 part $CCl_4$. The resulting emulsion is heated at 70° C. for 24 hours with constant agitation in a pressure-tight vessel or one containing a condenser. The resulting copolymer is precipitated, washed with water, then with methyl alcohol and then dried and ground. The dried copolymer is extracted with methanol.

Example 9

194 parts of 2-vinyldibenzofuran are fused with 193 parts of N-vinylcarbazole and heated at 125° C. for 30 hours, then for 24 hours at 150° C. A yellowish, hard polymerization mass is obtained which may be ground and used as a copolymer or compounded to form a molding compound or it may be dissolved in a suitable solvent and precipitated with a precipitant to remove the low molecular weight polymer and any unpolymerized monomer still present. This material has a high heat-distortion point—about 140° C. The proportions of N-vinylcarbazole to 2-vinyldibenzofuran may be varied at will. These two monomers may also be polymerized by any of the methods described in the foregoing examples, except that it is not necessary to use pressure-tight vessels or reflux condensers on these two high boiling monomers. If 1% of a wax, such as Barnsdall wax, is added to the above polymeric mass, the resistance to moisture is improved. Such a copolymer has excellent electrical properties and a much higher softening point than styrene.

Example 10

38.8 parts 2-vinyldibenzofuran and 17.2 parts of vinyl acetate are heated at 100° C. for 48 hours. The resulting polymeric mass may be treated or worked in the same manner as any thermoplastic material. Simultaneous polymerizations of vinyl acetate and 2-vinyldibenzofuran may be carried out by any of the foregoing methods.

Example 11

0.83 part benzoyl peroxide, 5.4 parts of butadiene, and 77.6 parts of 2-vinyldibenzofuran are heated at 100° C. for 24 hours in a pressure-tight vessel, then for 24 hours at 125° C. The resulting solid polymeric mass is dissolved in benzene and precipitated with methyl alcohol. Films cast from this material show considerably more flexibility and durability than films from 100% polyvinyldibenzofuran.

Example 12

5.4 parts of butadiene, 0.45 part benzoyl peroxide and 38.8 parts of 2-vinyldibenzofuran were heated at 100° C. 24 hours, then at 125° C. for 12 hours in a pressure-tight vessel. The resulting polymeric mass is ground and extracted with methyl alcohol to remove any remaining monomer. The product is a tough copolymer. Molded pieces produced from this copolymer are more shock-resistant than pieces molded from polyvinyldibenzofuran.

Example 13

5.4 parts of butadiene, 19.3 parts of 2-vinyldibenzofuran, and .25 part of benzoyl peroxide were heated at 100° C. for 24 hours, then at 125° C. for 24 hours in a closed vessel. The resulting polymeric mass was still somewhat difficultly soluble in benzene. The polymeric mass was precipitated with methyl alcohol. A film cast from this copolymer showed great flexibility (the film can be folded upon itself without tearing) and unusual electrical properties, a power factor of .07% at one megacycle and a dielectric constant of 3.2. The film is transparent in thin sections, but is a bluish white tinge in thicker sections.

Example 14

10.8 parts butadiene, 19.4 parts 2-vinyldibenzofuran and 0.2 part benzoyl peroxide were heated to 100° C. for 24 hours in a closed, pressure-tight vessel, then to 125° C. for 24 hours. In using larger amounts of butadiene, there is some small amount of butadiene left after the polymerization so the actual amount of butadiene in the copolymer is less than the amount indicated above. The above rubber-like polymerization mass shows evidence of insolubility, but is readily worked on rolls similar to the styrene-butadiene copolymers. Simultaneous polymerization of butadiene and 2-vinyldibenzofuran can also be carried out by any of the methods described in Examples 1 through 8.

Example 15

1 mol 2-vinyldibenzofuran and 1 mol ethyleneglycol dimethacrylate were heated at 65° C. for 24 hours, at 100° C. for 24 hours and at 125° C. for 24 hours in a large test tube. A clear, hard rod was produced. Before polymerizing, it is sometimes desirable to add a suitable loading material, such as mica dust, cellulose, graphite, silex, linen rags, etc.

Example 16

120 parts 2-vinyldibenzofuran, 80 parts of a mixture of three parts styrene and 2 parts divinylbenzene are heated at 125° C. for 48 hours. The resulting cross-linked polymerization mass can be readily machined and does not show signs of softening during the machining process.

Example 17

2 parts benzoyl peroxide, 194 parts of 2-vinyldibenzofuran, and 20 parts of diallylphthalate were heated 24 hours at 100° C. and 18 hours at 125° C. in long test tubes. The resulting rods show no signs of softening at 150° C. but show flexibility at this temperature.

Example 18

194 parts of 2-vinyldibenzofuran and 11 parts of divinyldibenzofuran were heated at 80° C. for 24 hours, at 100° C. for 24 hours, and at 125° C. for 12 hours. The resulting polymeric mass machines readily and possesses excellent electrical properties.

The copolymerizations described in Examples 15 through 18 can be carried out by any of the processes described in Examples 1 through 8 but since these cross-linked polymers are insoluble and infusible, it is usual to cast them in some predetermined form and polymerize them in place.

Example 19

38.3 parts of 2-vinyldibenzofuran and 20 parts of methylmethacrylate were heated at 100° C. for 12 hours in a closed vessel. The polymerization mass was hard after 4 hours, but in order to carry the polymerization as far as possible the heating was continued until 12 hours had elapsed. A hard, clear mass was obtained. The proportion of 2-vinyldibenzofuran to methylmethacrylate may be varied at will. These two monomers may also be polymerized by any of the methods described in Examples 1 through 8. The polymeric material produced is more heat resistant than polymethylmethacrylate and it possesses better electrical properties.

Example 20

194 parts of 2-vinyldibenzofuran and 116 parts of indene were heated in a pressure-tight vessel at 125° C. for 48 hours. The solid polymeric mass obtained is of relatively short chain length. Polymer of high molecular weight is obtained if the polymerization is carried out at lower temperatures. 2-vinyldibenzofuran and indene may be simultaneously polymerized in all proportions. Any of the methods described in Examples 1 through 8 may be used.

Example 21

98 parts of maleic anhydride, 194 parts of 2-vinyldibenzofuran, 3 parts of lauroyl peroxide, 300 parts of acetone and 200 parts of benzene are heated at 125° C. for 30 hours. A viscous liquid mixture is obtained from which the solid copolymerization mass may be precipitated by methyl alcohol. The proportion of maleic anhydride to 2-vinyldibenzofuran may be varied within wide limits. In place of benzoyl peroxide, any organic or inorganic peroxide, ozone, air, oxygen, or oxygen-liberating compounds may be used. The polymerization may be carried out more slowly in the absence of a catalyst. The choice of solvents will depend upon the relative amounts of maleic anhydride and 2-vinyldibenzofuran that are present. The viscosity and hence the average molecular weight of the copolymer produced also depends upon the amount of catalyst used, the temperature and the proportions of the polymerizing substances.

*Example 22*

74 parts of phthalic anhydride, 194 parts 2-vinyl dibenzofuran, 49 parts of maleic anhydride, 300 parts of benzene and 200 parts of acetone are heated at 100° C. for 24 hours. The resulting viscous liquid plus thinners or diluents and modifying agents may be used as a sticker or varnish. The catalysts and the conditions mentioned in Example 21 also apply here. The copolymeric content may be precipitated by alcohol or alcohol-water mixtures.

*Example 23*

194 parts of 2-vinyldibenzofuran, 52 parts of polystyrene, and 3 parts of benzoyl peroxide are dissolved in 600 parts of benzene and heated at 100° C. in a closed vessel for 48 hours. The resulting polymer may be precipitated in the form of a white powder by methyl alcohol.

*Example 24*

56 parts of isobutylene, 194 parts of 2-vinyldibenzofuran, and 0.60 part of benzoyl peroxide are heated at 100° C. for 48 hours. The resulting polymeric mass may be precipitated from a dilute solution in the form of a white powder by methyl alcohol.

The preceding examples illustrate the preparation of copolymers wherein the 2-vinyldibenzofuran comprises, by weight, from about 48 per cent to 91 per cent of the total weight of the copolymerizable ingredients. It will of course be understood that the applicant may employ larger or smaller proportions of the 2-vinyldibenzofuran without departing from the scope of his invention.

What I claim as new and desire to secure by Letters Patent of the United States is:

1. A composition comprising the product of polymerization of a mixture of different copolymerizable ingredients including 2-vinyldibenzofuran and a compound containing two $CH_2=C<$ groupings, the 2-vinyldibenzofuran comprising, by weight, from 48 to 91 per cent of the total weight of the copolymerizable ingredients.

2. The method of preparing a new synthetic composition which comprises polymerizing under heat and in the presence of a polymerization catalyst, a mixture containing 19.3 parts by weight of 2-vinyldibenzofuran and 5.4 parts by weight of butadiene.

3. A copolymer of 2-vinyldibenzofuran and butadiene which is the copolymerization product of 19.3 parts by weight of 2-vinyldibenzofuran and 5.4 parts by weight of butadiene.

4. A composition of matter comprising the product of polymerization of a mixture of ingredients including 2-vinyldibenzofuran and styrene, the 2-vinyldibenzofuran comprising from about 48 to 91% of the total weight of the copolymerized ingredients.

5. A composition of matter comprising the product of polymerization of a mixture of ingredients comprising 2-vinyldibenzofuran and butadiene, the 2-vinyldibenzofuran comprising from 48 to 91% of the total weight of the latter and the butadiene.

6. A composition of matter comprising the product of polymerization of a mixture of ingredients comprising 2-vinyldibenzofuran and N-vinyl carbazole, the 2-vinyldibenzofuran comprising from 48 to 91% of the total weight of the latter and the N-vinyl carbazole.

7. A composition comprising the product of polymerization of a mixture of different copolymerizable ingredients including 2-vinyldibenzofuran and a compound containing not more than two $CH_2=C<$ groupings, the 2-vinyldibenzofuran comprising, by weight, from 48 to 91 per cent of the total weight of the copolymerizable ingredients.

EDWARD A. KERN.

REFERENCES CITED

The following references are of record in the file of this patent:

FOREIGN PATENTS

| Number | Country | Date |
|---|---|---|
| 487,604 | Great Britain | June 22, 1945 |